O. F. MEHLIN.
AUTOMOBILE LOCK.
APPLICATION FILED FEB. 10, 1921.
1,420,205.
Patented June 20, 1922.
2 SHEETS—SHEET 1.
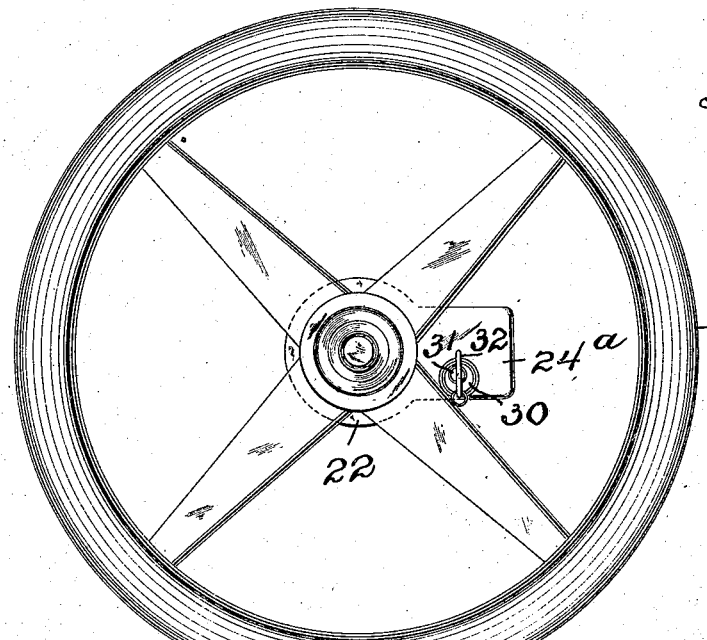
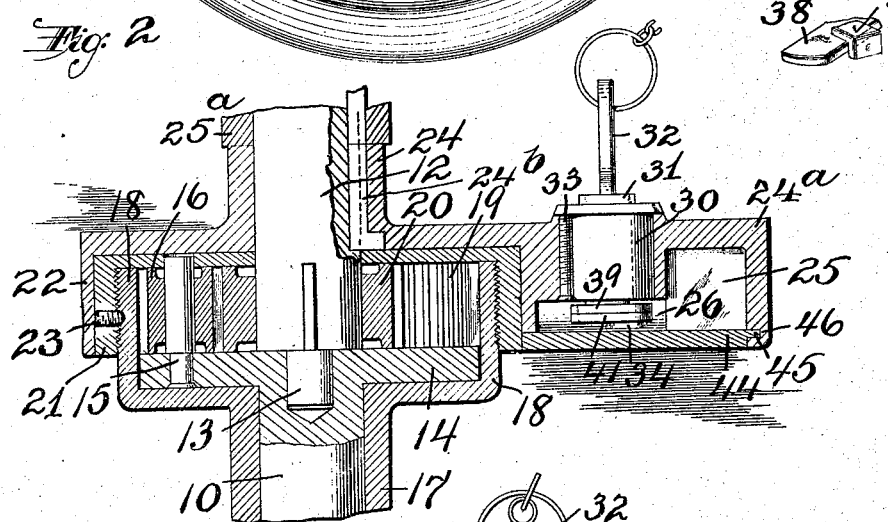
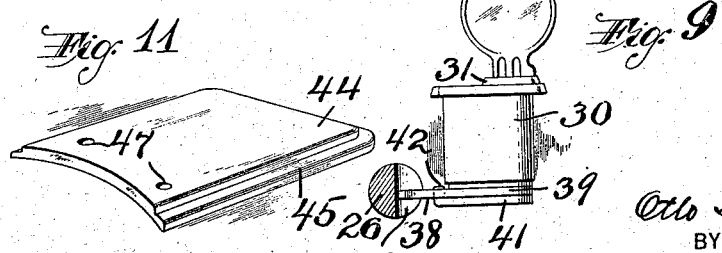
INVENTOR:
Otto F. Mehlin,
BY
Wm H Canfield,
ATTORNEY.

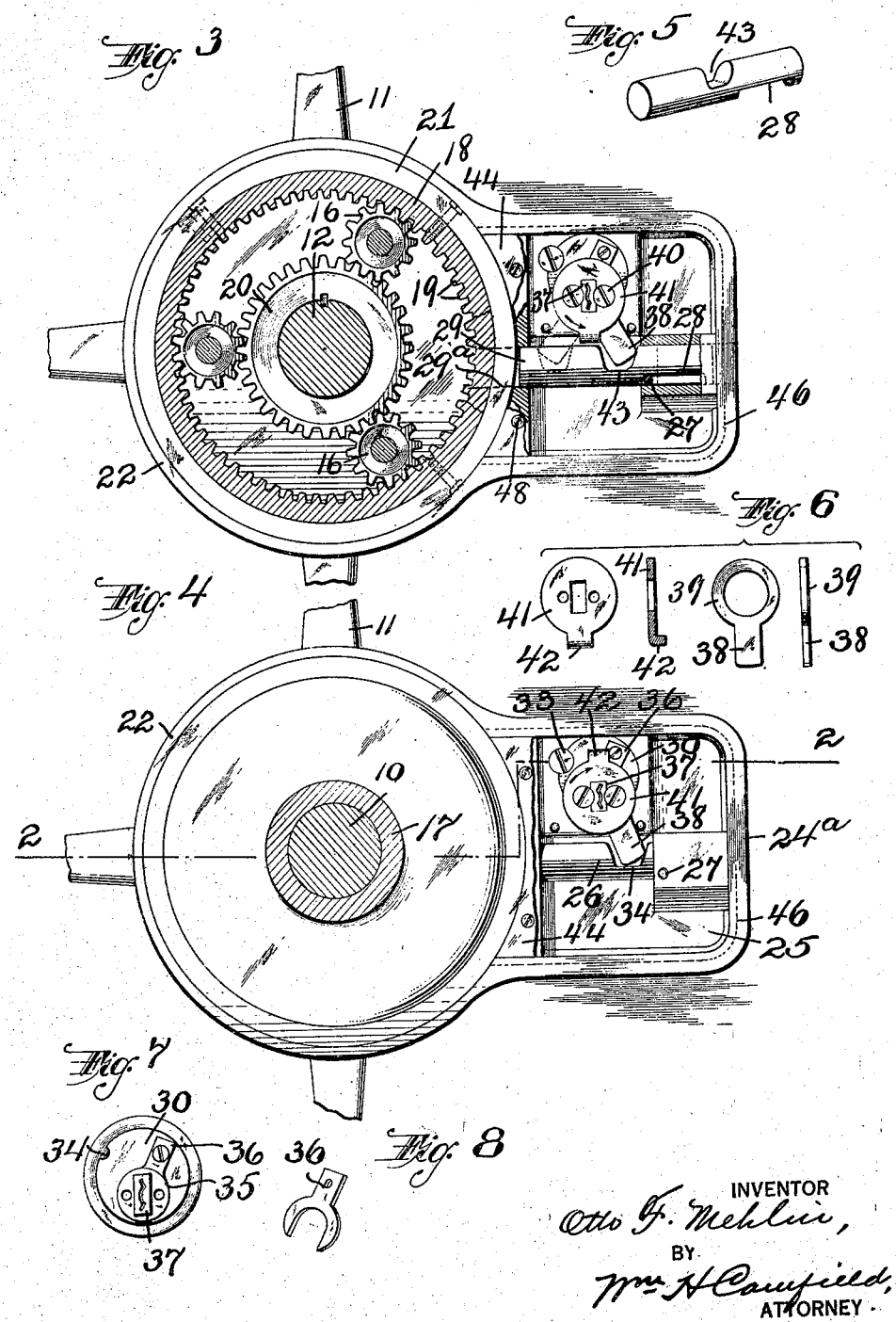

UNITED STATES PATENT OFFICE.

OTTO F. MEHLIN, OF WEST NEW YORK, NEW JERSEY, ASSIGNOR TO AUTO SAFETY DEVICE COMPANY, OF NEWARK, NEW JERSEY.

AUTOMOBILE LOCK.

1,420,205.   Specification of Letters Patent.   Patented June 20, 1922.

Application filed February 10, 1921. Serial No. 443,884.

*To all whom it may concern:*

Be it known that I, OTTO F. MEHLIN, a citizen of the United States, and a resident of West New York, county of Hudson, and State of New Jersey, have invented certain new and useful Improvements in Automobile Locks, of which the following is a specification.

This invention relates to an improved lock, and is particularly adapted for use as an automobile lock of the type employed to lock the steering wheel. In locking devices of this kind it is essential that the wheel be held against movement when locked, as this prevents theft, but it is equally important to hold the device against accidental locking while the car is in motion, as this prevents accident.

It is to provide a means for positively locking or unlocking the steering device of automobiles that I have devised the present construction, and while its application is not necessarily limited, I desire, to insure a clear understanding of the invention, to describe it as applied to the form of lock shown in Patent No. 1,360,673, issued Nov. 30, 1920 to John A. Olbon.

The invention is illustrated in the accompanying drawings, in which Figure 1 is a top view of a steering wheel with the lock applied thereto. Figure 2 is a section of part of the steering post and the steering wheel shaft, taken on line 2—2 in Figure 1. Figure 3 is a bottom view showing the lid removed from a side chamber of the device and showing a portion of a planetary mechanism of the steering device in section. Figure 4 is a similar view with the planetary mechanism concealed by the casing. Figure 5 is a perspective view of a bolt used in the lock. Figure 6 is a detail of elements on the end of the locking member engaging the bolt. Figure 7 is a view of the end of the locking member with the parts shown in Figure 6 removed. Figure 8 is a perspective view of a clip to hold the locking member against withdrawal. Figure 9 is a detail view showing the locking member and its barrel in elevation and the bolt in section. Figure 10 is a detail perspective showing the manner of engagement of a finger and a clip illustrated in Figure 6, and Figure 11 is a perspective view of the lid of the bolt chamber.

The invention will be described as applied to an automobile lock employed to hold the steering wheel, and consequently the steering rod, against rotation, and in the form shown the steering rod is indicated at 10 and the steering wheel at 11, the steering wheel being mounted on a shaft 12 which has a short stud 13 which rotates on the end of the rod 10, the rod 10 having a disk 14 on its upper end, which disk acts as a support for the pins 15 on which the pinions 16 rotate.

The steering rod casing 17 has a cup-shaped top 18 which holds the planetary gear system, and the marginal flange of which has teeth 19 with which the pinions 16 mesh, these pinions also meshing with a gear 20 which I will describe as the external gear, since the teeth are on the outside, to differentiate it from the gear 19, which is an internal gear, since the teeth are on the inner face.

A cup-shaped cover 21 of the steering rod casing is employed to cover the cup-shaped part 18 and fits snugly in one end of the lock casing 22 and is securely fastened in position by such means as the set-screw 23. The lock casing 22 has a shoulder 24 against which the shoulder $25^a$ of the steering wheel 11 bears, whereby the whole device is securely held against removal from the steering mechanism. The casing 22 has an extension $24^a$ which is preferably integral therewith and encloses a chamber 25 in which the bolt 26 slides, the bolt 26 being kept from turning by the pin 27 which fits against the flat side 28 of the bolt, and which bolt has its end 29 adapted to slide into the hole $29^a$ in the parts 21 and 18, so that when the bolt is slid back the lock casing is free to turn with the steering wheel, but when the bolt is slid forward to enter the holes $29^a$ the lock casing, and consequently the steering wheel are locked against turning as they are secured together by the key $24^b$, which is preferably made as shown in Figure 2, with a shoulder on the bottom which prevents its withdrawal, even if the steering wheel and its shoulder $25^a$ are removed.

Seated in a wall of the extension 24 of the casing 22 is a barrel 30 which contains the locking member 31, this locking member being of the usual type in which the key 32 can be inserted only at one point in the locking member's rotation. The locking member is free to be rotated when the key is in place, but when the key is withdrawn at the one point at which it can be withdrawn, the locking member is held against any rotation. The interior mechanism of this locking member is not shown because it is an ordinary article of commerce and in detail forms no part of this invention.

The barrel is held in place by suitable means, such as the screw 33, which not only holds the barrel against withdrawal, but against rotation, as the screw-threaded perforation in which it fits is half in the barrel, as at 34 in Figure 7, and the other half is in the casing.

The inner end of the locking member is provided with a disk 35, behind which is arranged a fork 36 which is securely held in place by a screw or other means and prevents any outward movement of the locking member relative to the barrel. Beyond the disk 35 is a rectangular portion 37. A finger 38, shown in detail in Figure 6, has an eye 39 on the end of it, which eye fits around the disk 35 and is freely rotatable thereon.

Fitting on the face of the disk 35, and held in place preferably by a pair of screws 40, is a plate 41 which has a lip 42, which lip is bent down so that it extends over into the path of travel of the finger 38, this being clearly evident from Figure 10. The bolt 26 has a recess 43, into which recess the finger 38 extends and by means of which the bolt is slid.

In Figures 3 and 4 I show, in full lines, the position the finger and the bolt occupy when the bolt 26 is slid back to release the steering wheel so that it can be operated. It will be noted that the finger has been forced to this position by the rotation of the lip 42 on the plate 41, and it will be evident that when the key 32 is withdrawn the parts are locked in this position, and any vibration or jarring of the car in its passage over rough roads can not dislodge the bolt to permit it to extend into the casing of the planetary mechanism to lock the steering wheel against its free and normal use. When it is desired, however, to lock the device, the key is inserted, and the locking member, which carries with it the plate 41, is turned in the direction of the small arrow in Figure 4, and the lip 42 then makes a complete rotation, engages the other edge of the finger 38 and the parts are swung to the position shown in dotted outline in Figure 3, and then when the key is withdrawn the bolt 26 is locked against any removal from such dotted position.

It will be observed that the width of the lip 42 is such that, when it is in its normal locking position, it maintains the finger 38 securely in position and a complete rotation of the locking member, each time the bolt is to be operated, is necesary, the finger 42 alternately engaging first one edge and then the other of the recess 43 to hold the bolt 26 in its limits of movement.

The bottom of the chamber 25 of the extension 24 is closed by a lid 44 which has flanges 45 which fit into grooves 46, these grooves being disposed so that the lid is slid on before the casing 22 is put in place, that is, the lid slides on before the cup-shaped piece 21 is inserted, and is thus held against retreating, and is furthermore provided with holes 47, into which the screws 48 are screwed to assist in holding the device securely against rattling and against removal.

The plate 44 is placed preferably in close proximity to the plate 41 so that the screws 40, if they become loosened, can not retreat far enough to prevent the plate 41 being positively rotated with the locking member 31.

It will be evident that minor details can be changed without departing from the scope of the invention.

I claim:

The combination of a steering rod and its casing and a steering wheel on the rod above the casing, with a lock casing secured so as to rotate with the steering rod, said lock casing including an extension, a lock in said extension for securing the lock casing against rotation relative to the steering rod casing, the extension having an open side with grooves adjacent its outer edges, and a lid adapted to slide in said grooves and locked against withdrawal by the steering post casing when the parts are assembled.

In testimony that I claim the foregoing, I have hereto set my hand, this 9th day of February, 1921.

OTTO F. MEHLIN.